Jan. 5, 1960    C. E. J. NYBERG    2,919,935
HOSE COUPLING
Filed March 5, 1956
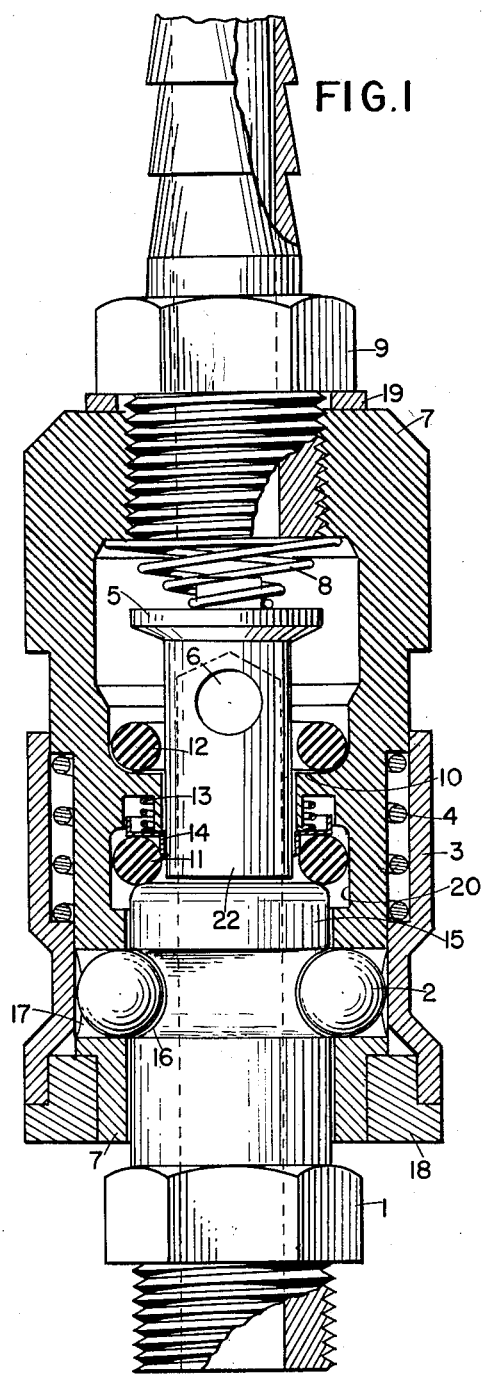
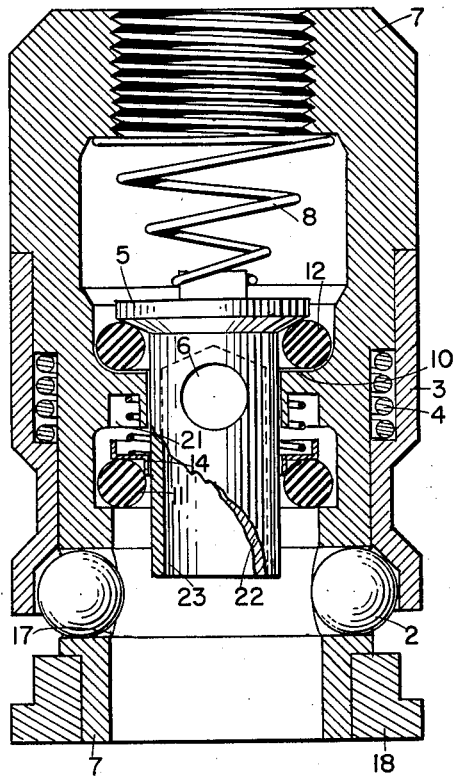
Carl E. J. Nyberg
INVENTOR.
BY Karl F. Ross
AGENT.

United States Patent Office 2,919,935
Patented Jan. 5, 1960

2,919,935

HOSE COUPLING

Carl E. J. Nyberg, Skovde, Sweden

Application March 5, 1956, Serial No. 569,398

Claims priority, application Sweden March 9, 1955

3 Claims. (Cl. 284—18)

My present invention relates to a coupling particularly adapted for connecting tubes or hoses to a source of compressed air or other fluid under pressure.

The general object of this invention is to provide a simplified coupling of the character described, designed for rapid connection and disconnection of a tube or hose to and from an outlet for the fluid under pressure, which requires little maintenance and in which the parts subjected to the greatest wear may be conveniently replaced whenever required.

In accordance with the present invention I provide a female coupling section or socket in which a spring-loaded valve member is axially slidable so as to be repressed against its spring force by the insertion of a corresponding male coupling member or fitting into the open end of the socket, this member when so inserted bearing upon a deformable sealing ring resting against an annular shoulder within the socket. The deformable ring, which is lodged within a recess of a diameter somewhat larger than that of the open end of the socket, is readily insertable into the socket housing and withdrawable therefrom through that open end but, in accordance with a particular feature of my invention, is prevented from spontaneously dropping out of the housing by being acted upon by a spring-loaded guard ring slidably surrounding the aforementioned valve member. The guard ring advantageously is of Z-shaped cross section so as to have an internal flange embracing the valve member and an external flange confining its spring. Furthermore, a second deformable sealing ring is preferably interposed between the internal shoulder of the socket housing and an external flange on the valve member so as to be compressed between these two elements to form a tight closure when the male fitting is withdrawn.

The invention will be described in greater detail with reference to the accompanying drawing in which:

Fig. 1 is an elevational view, partly in axial section, of a hose coupling embodying the invention; and Fig. 2 is a view similar to Fig. 1 but showing only the female coupling section after withdrawal of the male fitting therefrom.

The coupling shown in the drawing comprises a tubular male section or fitting 1 provided, near its free end 15, with an annular groove 16 adapted to receive a plurality of clutch balls 2 (only two shown) which are lodged in radial perforations 17 of a tubular casing 7 constituting a socket or complementary female section for the fitting 1. A sleeve 3 surrounds the lower part of casing 7 and may be axially displaced in an upward direction, against the force of a spring 4, to free the clutch balls 2 for outward movement whenever it is desired to insert or to remove the fitting 1. The stroke of the sleeve 3 is limited by a retaining ring 18 at the lower end of the casing.

A nipple 9 is screwed into the upper end of casing 7, with interposition of a gasket 19. The casing 7 is divided by an internal annular shoulder 10 into an upper and a lower chamber of which the latter, designed to receive the fitting 1, is formed with an annular recess 20 directly below shoulder 10, this recess accommodating a deformable ring 11 (known as an O-ring) which is prevented by the lower edge of the recess from dropping out of the casing in the absence of fitting 1. Sealing ring 11 is under pressure from a coil spring 13 which is lodged in an annular groove 21 on the underside of shoulder 10 and bears upon the ring 11 through the intermediary of a guard ring 14 of Z-shaped cross section; ring 14 loosely surrounds a valve member 22 which is guided by shoulder 10 for sliding movement in axial direction of casing 7. A conical compression spring 8, seated in the upper chamber of casing 7, bears upon the closed upper end of valve member 22 whose lower end is provided with a bore 23 communicating with a transverse aperture 6; the upper end of member 22 is further provided with a peripheral flange 5 whose outer radius is larger than the inner radius of shoulder 10 and which is urged toward that shoulder by the spring 8, thereby bearing upon another deformable sealing ring 12 lodged in the casing 7 immediately about shoulder 10.

When the coupling shown in the drawing is not in use, as is illustrated in Fig. 2, the valve member 22 is urged downwardly by the spring 8 to flatten the ring 12 against shoulder 10, this downward pressure upon member 22 being reinforced by the action of compressed air from a source not shown to which the female section may be permanently connected by means of nipple 9. It will be noted that under these conditions the connection between the two chambers of casing 7 is cut off as the opening 6 is withdrawn below shoulder 10. At the same time the spring 13 exerts pressure upon guard ring 14 to compress the deformable sealing ring 11 against the lower edge of recess 20, thereby preventing this latter ring from leaving the casing even if the parts should have become slightly worn. When, now, the fitting 1 is inserted as illustrated in Fig. 1, this being accomplished upon the upward displacement of sleeve 3 into the position shown in Fig. 2, valve member 22 is repressed upwardly and establishes a connection between the interior of nipple 9 and that of fitting 1 through the upper chamber of casing 7, opening 6 and bore 3 of member 22. At the same time, the ring 11 is compressed between the end 15 of fitting 1 and the shoulder 10 of casing 7 (guard ring 14 having been partly retracted into groove 21) so as to prevent any escape of pressure fluid from the upper casing chamber into the atmosphere through a leakage path extending between valve member 22 and shoulder 10 and further between fitting 1 and the lower end of casing 7.

It will be understood that the O-rings 11 and 12 need not necessarily be of round cross section and that the upper end 15 of fitting 1 may be beveled to facilitate its outward camming action upon the balls 2; suitable means known per se may, of course, be provided to prevent these balls from dropping out of the perforations 17, upon the withdrawal of fitting 1, if the stroke of valve member 22 should be insufficient for this purpose. These and other modifications will be readily apparent to persons skilled in the art and are intended to be embraced within the scope of the invention as defined in the appended claims.

I claim:

1. In a hose coupling, a female coupling section comprising a tubular casing provided with an internal annular shoulder, said shoulder dividing the interior of said casing into a pair of axially separated chambers, a valve member slidably engaging said annular shoulder and provided at one end with a flange located within one of said chambers, said flange having an outer diameter greater than the inner diameter of said shoulder, a first spring within said one chamber axially bearing upon said valve member in a sense urging said flange toward said shoulder, said valve member being provided with an internal bore opening into the other of said chambers at the end of said member remote from said flange and with a lateral outlet for said bore, said other chamber being provided with an annular recess adjacent said shoulder, said other chamber having an open end of a diameter smaller than that of said recess to receive a complementary male coupling section, said valve member projecting into said other chamber to a sufficient extent to be displaceable by said male coupling section, against the force of said first spring, into an unblocking position in which said chambers communicate with each other by way of said bore and said outlet, said first spring being adapted to restore said valve member to a blocking position in which said outlet is sealed against said one chamber by said shoulder, a flattenable sealing ring received in said recess, a guard ring inserted between said shoulder and said sealing ring, both of said rings surrounding said valve member with freedom of axial displacement relative thereto and to said casing, and a second spring inserted between said guard ring and said shoulder for urging said sealing ring toward said male coupling section upon operative introduction of the latter into said other chamber, thereby causing deformation of said sealing ring in a manner barring the escape of fluid from said casing through said open end.

2. A female coupling section according to claim 1, further comprising a second sealing ring inserted in said one chamber between said shoulder and said flange.

3. A female coupling section according to claim 1 wherein said guard ring is provided with an external flange confining said second spring.

References Cited in the file of this patent
UNITED STATES PATENTS

| | | |
|---|---|---|
| 743,798 | Allwardt | Nov. 10, 1903 |
| 1,066,066 | Vidy | July 1, 1913 |
| 1,825,941 | Davis | Oct. 6, 1931 |
| 2,279,146 | Schneller | Apr. 7, 1942 |
| 2,377,812 | Scheiwer | June 5, 1945 |
| 2,706,646 | Olson | Apr. 19, 1955 |
| 2,744,770 | Davidson et al. | May 8, 1956 |